(12) United States Patent
Hamann et al.

(10) Patent No.: US 11,977,759 B2
(45) Date of Patent: May 7, 2024

(54) METHOD FOR OPERATING A CACHE MEMORY, CACHE MEMORY AND PROCESSING UNIT

(71) Applicant: Robert Bosch GmbH, Stuttgart (DE)

(72) Inventors: Arne Hamann, Ludwigsburg (DE); Dakshina Narahari Dasari, Boeblingen (DE); Dirk Ziegenbein, Freiberg Am Neckar (DE); Falk Rehm, Renningen (DE); Michael Pressler, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1 day.

(21) Appl. No.: 17/892,951

(22) Filed: Aug. 22, 2022

(65) Prior Publication Data
US 2023/0061562 A1 Mar. 2, 2023

(30) Foreign Application Priority Data
Aug. 25, 2021 (DE) ...................... 10 2021 209 321.3

(51) Int. Cl.
*G06F 3/06* (2006.01)

(52) U.S. Cl.
CPC ............ *G06F 3/064* (2013.01); *G06F 3/0617* (2013.01); *G06F 3/0659* (2013.01); *G06F 3/0679* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 4,882,642 A * 11/1989 Tayler ................. G06F 12/0866
711/E12.019
4,956,803 A * 9/1990 Tayler ................. G06F 12/0866
711/138

(Continued)

OTHER PUBLICATIONS

V. Gopalakrishnan, B. Bhattacharjee and P. Keleher, "Distributing Google," 22nd International Conference on Data Engineering Workshops (ICDEW'06), Atlanta, GA, USA, 2006, pp. 33-33, doi: 10.1109/ICDEW.2006.49. (Year: 2006).*

(Continued)

*Primary Examiner* — Daniel C. Chappell
(74) *Attorney, Agent, or Firm* — NORTON ROSE FULBRIGHT US LLP; Gerard A. Messina

(57) ABSTRACT

A method for operating a cache memory having a set having multiple memory blocks configured for storing data blocks. In a write process of a data block into a memory block of the set, the data block is written into the memory block, a relevance rank value of the data block and a first access time rank value are determined. Rank data associated with the memory block are determined using a write rank mapping from the relevance rank value and the first access time rank value, and the determined rank data are stored. If no memory block of the set is free, a memory block that is to be overwritten is selected from the memory blocks of the set based on the rank data, which are associated with the memory blocks, and the data block to be stored is written into the selected memory block by using the write process.

18 Claims, 2 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2003/0697; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 5,134,563 A | * | 7/1992 | Tayler | G06F 12/0888 |
| | | | | 711/143 |
| 5,253,351 A | * | 10/1993 | Yamamoto | G06F 12/0866 |
| | | | | 711/E12.019 |
| 5,761,717 A | * | 6/1998 | Vishlitzky | G06F 12/123 |
| | | | | 427/249.7 |
| 2006/0041720 A1 | * | 2/2006 | Hu | G06F 12/0811 |
| | | | | 711/E12.076 |
| 2015/0046385 A1 | * | 2/2015 | Shimizu | G06F 3/0653 |
| | | | | 706/52 |
| 2017/0075812 A1 | * | 3/2017 | Wu | G06F 12/0868 |
| 2020/0396320 A1 | * | 12/2020 | Clemm | H04L 47/00 |
| 2022/0308781 A1 | * | 9/2022 | Nakayama | G06F 3/0664 |

OTHER PUBLICATIONS

R. Zhang et al., "Three-level Compact Caching for Search Engines Based on Solid State Drives," 2021 IEEE 23rd Int Conf on High Performance Computing & Communications; pp. 16-25; doi: 10.1109/HPCC-DSS-SmartCity-DependSys53884.2021.00030. (Year: 2021).*

A. Lobzhanidze and W. Zeng, "Proactive caching of online video by mining mainstream media," 2013 IEEE International Conference on Multimedia and Expo (ICME), San Jose, CA, USA, 2013, pp. 1-6, doi: 10.1109/ICME.2013.6607441. (Year: 2013).*

Moinuddin K. Qureshi, Aamer Jaleel, Yale N. Patt, Simon C. Steely, and Joel Emer. 2007. Adaptive insertion policies for high performance caching. In Proceedings of the 34th annual international symposium on Computer architecture (ISCA '07). ACM, New York, NY, USA, 381-391. doi: 10.1145/1250662.1250709 (Year: 2007).*

* cited by examiner

METHOD FOR OPERATING A CACHE MEMORY, CACHE MEMORY AND PROCESSING UNIT

CROSS REFERENCE

The present application claims the benefit under 35 U.S.C. § 119 of German Patent Application No. DE 10 2021 209 321.3 filed on Aug. 25, 2021, which is expressly incorporated herein by reference in its entirety.

FIELD

The present invention relates to a method for operating a cache memory, to a cache memory and to a processing unit.

BACKGROUND INFORMATION

Microprocessors may comprise a cache memory or temporary storage or may be connected to one, in which data, which are stored in a main memory (e.g., a working memory), may be stored temporarily, in order to be able to access these more quickly in the event that these data are required again. Usually, the cache memory has a higher clock frequency, a greater memory bandwidth and/or a lower latency than the main memory and is markedly smaller than the main memory due to the associated more elaborate manufacture.

SUMMARY

According to the present invention, a method for operating a cache memory, a cache memory and a processing unit are provided. Advantageous developments of the present invention are disclosed herein.

When determining memory blocks in the cache memory that are to be overwritten, an example embodiment of the present invention makes us of the measure of taking into account, in addition to the access time (i.e., the time of the access), a relevance, encoded as a relevance rank value, of the data blocks stored therein. This makes it possible to increase the probability of a cache hit and thereby increase the execution speed of computer programs as compared to taking only the access time into account, since data blocks, which contain data, which are likely or with greater probability accessed repeatedly in the program execution, may be assigned a higher relevance than other data blocks. In particular, an unfavorable cache behavior may be suppressed by time-critical applications.

In detail, according to an example embodiment of the present invention, the method for operating a cache memory, which includes at least one set of multiple memory blocks configured for storing data blocks, provides that in a process of writing a data block into a memory block of the set (i.e., in a cache write access), the data block is written into the memory block, that a relevance rank value of the data block and a first access time rank value are determined, that rank data associated with the memory block are determined by way of a write rank mapping from the relevance rank value and the first access time rank value, and that the rank data associated with the memory block are stored. If no memory block of the set is free, a memory block to be overwritten is selected from the memory blocks of the set on the basis of the rank data associated with the memory blocks, and the data block to be stored is written into the selected memory block by using the write process. This thus implies replacing the data blocks stored in a cache memory with new data blocks. If a memory block is free, the data block to be stored is expediently written into the free memory block. If multiple memory blocks are free or unoccupied, any one of these memory blocks may be selected (if applicable, by taking into account the associativity). It is essential that here too the write process, in which rank data are determined and stored, is used.

The term "cache memory" or "buffer memory" denotes a temporary storage associated with a processor, in which data, which are stored in a main memory (which is slow compared to the cache memory), may be stored temporarily, so that these may be accessed by the processor more quickly if they are required again. The term "memory block" or "cache block" denotes a section of the cache memory or of the set, which corresponds in its size to the data blocks, which are accessed jointly in the main memory. This size, or at least the minimum size, is determined essentially by the memory bus width of the main memory. Instead of the term "memory block" or "cache block", it is also possible to use the term "cache line". Multiple memory blocks are combined into a "set" or "cache set", also called a "cache group", which is associated with a section of the main memory, i.e., data blocks in this section are stored in the associated set.

The relevance rank value may be regarded as a value that indicates to what extent a longer or shorter storage of the data block in the cache memory is decisive for the execution speed of a computer program that comprises this data block or accesses it. The relevance rank value may be an arbitrary number or more generally also multiple numbers. The set of different relevance rank values is preferably finite and is given in particular by a subset of the integers or of the natural numbers, e.g., $\{0, 1, 2, \ldots, M-1\}$. Further preferably, the number M, for example M=2 or M=4, of different relevance rank values is a power of 2, i.e., $M=2^N$ for an integer N, so that the relevance rank values may be encoded and stored efficiently as N bit patterns.

According to an example embodiment of the present invention, in order to store the relevance rank values, a relevance field may be provided for a data block in a page table entry in a page table, which assigns physical memory addresses (i.e., actual memory addresses of the main memory) to logical memory addresses (i.e., memory addresses in a virtual address space from the perspective of the processor or of a program), in which the relevance rank value of the data block is stored or may be stored. Alternatively, it may be provided that page table entries only have categorization fields (e.g., one bit), in which a value indicates whether a relevance rank value exists for the respective data block. The relevance rank values for data blocks, for which a relevance rank value exists, may then be stored in a relevance table or relevance list. For data blocks, for which no relevance rank value exists, a standard relevance rank value may be used. For the page table and, if indicated, for the relevance table or relevance list, a separate buffer memory is preferably provided, which may also be contained in the cache memory, in particular in its control unit. In the event of memory accesses, these additional fields in the page table entries and, if indicated, the relevance table or relevance list may be read and the corresponding relevance rank values may be used in the method.

The first/second access time rank value corresponds to the time, at which the last cache access of the memory block occurred, or to the placement of the respective cache access in a time series of cache accesses. Here, as above, the term "cache access" is to include both cache write accesses or write accesses as well as, as below, cache read accesses. Cache accesses may be numbered in accordance with their time sequence for example, the access time rank value of a cache access being the number of this cache access in accordance with the numbering.

Both the relevance rank value as well as the access time rank value may comprise multiple individual values (e.g., numerical values). These terms are thus to be understood generally as "at least one relevance rank value" and "at least one access time rank value", respectively.

According to an example embodiment of the present invention, in a cache read access, in which a stored data block is read out of a memory block of the set, the relevance rank value of the data block to be read and a second access time rank value are preferably determined, rank data assigned anew to the memory block are determined by way of a read rank mapping from the relevance rank value and the second access time rank value, and the newly determined rank data associated with the memory block are stored. The read rank mapping is preferably identical to the write rank mapping. A cache read access to the cache memory occurs when a cache hit occurs, i.e., requested data (requested by a processor for example) are contained in a data block, which is stored in a memory block of the set. The requested data may then be read out of this memory block without having to access a main memory, which contains the data to be stored temporarily in the cache memory.

The rank data preferably comprise a combined rank value, a combination function being applied to the relevance rank value and the first and second access time rank value, respectively, in order to determine the combined rank value. Preferably, a memory block of the set that has the lowest combined rank value is selected as the memory block to be overwritten or a memory block of the set that has the highest modified combined rank value is selected as the memory block to be overwritten.

According to an example embodiment of the present invention, the determination of the combined rank value may be part of the write rank mapping and/or of the read rank mapping, it being possible to provide different combination functions for the write rank mapping and the read rank mapping. The formation of combined rank values is advantageous since these may be evaluated without great effort and therefore quickly. If the relevance rank value is denoted by P, the access time rank value by R, the modified access time rank value by $R_{comb}$ and the relevance function by g, then $R_{comb}=g(P, R)$.

According to an example embodiment of the present invention, the rank data preferably comprise a modified access time rank value, a relevance function being applied to the relevance rank value and the result being used to determine the modified access time rank value by computation with the access time rank value, e.g., by addition, subtraction, multiplication or division. Preferably, a memory block of the set that has the lowest modified access time rank value is selected as the memory block to be overwritten or a memory block of the set that has the highest modified access time rank value is selected as the memory block to be overwritten.

The determination of the modified access time rank value is part of the write rank mapping and/or of the read rank mapping, it being possible to provide different relevance functions for the write rank mapping and the read rank mapping. In the following example of a linear function, the constant a could be chosen to be greater in terms of absolute value in the case of a read rank mapping than in the case of a write rank mapping in order to take into account that a data block, for which a cache hit occurs, will be required again later with greater probability.

If the relevance rank value is denoted by P, the access time rank value by R, the modified access time rank value by $R_{mod}$ and the relevance function by f, then $R_{mod}=f(P)+R$. In the value range of the relevance rank values, the relevance function should be monotonically increasing (or decreasing). In this context, linear, quadratic etc. functions or also other functional dependencies are possible. Thus, in the case of a linear function, $f(P)=a \cdot P+b$; with real constants a, b; for example $f(P)=6 \cdot P-1$, so that $R_{mod}=6 \cdot P-1+R$. Furthermore, depending on the relevance rank value, various functional dependencies are also possible. For example, for data blocks having a relevance rank value P equal to 0, the modified access time rank value $R_{mod}$ could be equal to the access time rank value R ($R_{mod}=R$, für P=0), and for data blocks having the relevance rank value P unequal to 0, a function as mentioned above could be applied ($R_{mod}=f(P)+R$, for $P \neq 0$).

Whether the memory block having the lowest combined or modified rank value or the memory block having the highest combined or modified rank value is selected as the memory block to be overwritten depends on the encoding, i.e., in which direction (ascending or descending) the combined or modified rank values indicate that the respective memory block should not be overwritten. If the access time rank value R is for example an ascending numbering of cache accesses, then the memory block having the lowest modified rank value is selected.

In both of the aforementioned variants, if multiple memory blocks of the set have the same lowest or the same highest combined or modified access time rank value, it is preferably possible to select the memory block of these multiple memory blocks as the memory block to be overwritten, which has the lowest relevance rank value, or the one that has the highest relevance rank value.

According to an example embodiment of the present invention, the rank data preferably comprise a step value, the step value being determined in the write process based on the relevance rank value of the data block to be written, the step value being changed after respectively a specific number of cache write accesses and/or cache read accesses. Preferably, following the specific number of cache write accesses and/or cache read accesses, the step value is reduced or increased and a memory block that has the lowest step value is selected as the memory block to be overwritten or a memory block that has the highest step value is selected as the memory block to be overwritten. Further preferably, the rank data comprise the access time rank value and, if multiple memory blocks have the lowest or the highest step value, the memory block is selected as the memory block to be overwritten that has the lowest access time rank value or, respectively, that has the highest access time rank value. For example, step values 0, 1, . . . , S may be provided, wherein, if a data block is to be overwritten, the occupied memory block is selected that has the lowest step value and, if multiple memory blocks have the same step value, the memory block from among these is selected that has the lowest access time rank value. For this variant, the rank data may be stored e.g., as lists, a list being provided for each step value, in which the memory blocks (or addresses of the memory blocks in the set) having this step value and the corresponding access time rank values are indicated. Following the specified or determined number of cache accesses, the step value of all memory blocks is lowered by one. In the case of a cache hit or cache read access, the rank data (i.e., step value and access time rank value) of the read memory block may be determined and updated anew, i.e., this memory block is again categorized at a higher step value if more than the determined number of cache accesses since the last access to this memory block have come to pass.

Preferably, in the case of cache write accesses and/or in the case of cache read accesses, the respectively associated rank data of one or multiple memory blocks not affected by the cache access are updated. For this purpose, an update rank mapping may be used, which may be a function of the old rank data, the relevance rank values and/or the access time rank values and which maps these onto the updated rank data, which are then stored. An update may involve, e.g., a change of combined or modified access time rank values or, if the rank data encode a relative priority of the memory blocks, an update of these relative priorities. Relative priorities are expedient, since these may be stored efficiently in bit patterns. If a set comprises four memory blocks for example, then two bits per memory block suffice for the encoding.

The present invention preferably comprises a determination of the relevance rank values for data blocks, at least one computer program, which comprises the data blocks or access these, being executed repeatedly by a processor connected to the cache memory, and execution times being measured, it being possible for one or multiple data blocks to be tested to be selectively excluded from storage in the cache memory or, after an initial storage in the cache memory, to be prevented from being deleted from the latter for a specified number of memory accesses, in order to determine the relevance rank values of these data blocks to be tested based on the execution times. A higher relevance and a corresponding relevance rank value may be assigned to tested data blocks, which, in the event that they cannot be deleted from the cache for the specified number of memory accesses, result in shorter execution times.

Data blocks that are not tested may be assigned a standard relevance rank value, in particular one corresponding to a low relevance. Alternatively, untested data blocks may be identified as "without relevance rank value", which is then taken into account by the write and/or read rank mapping. Tested data blocks may likewise be identified as "with relevance rank value". Altogether, only one bit ("without relevance rank value"/"with relevance rank value") is necessary for identifying the data blocks, a table or list (relevance table or relevance list) with the corresponding relevance rank values being additionally provided for those data blocks "with relevance rank value". To save time, it is thus not necessary to test all data blocks that comprise program data. The data blocks to be tested may be selected by one skilled in the art on the basis of the structure of the computer program with which he is familiar. It is also possible, however, initially to observe memory accesses to the main memory in the program execution, and then to select data blocks to be tested from areas of the main memory that are accessed relatively often.

Accordingly, according to an example embodiment of the present invention, the method furthermore preferably comprises an update of page table entries in order to store the determined relevance rank values; wherein, in a relevance field of a page table entry that refers to a tested data block, the determined relevance rank value for this data block is stored. Alternatively, in a classification field of a page table entry, which refers to a tested data block, a value is stored that indicates that a relevance rank value was determined for this data block, and the relevance rank value determined for this data block is stored in a relevance table or relevance list. The classification field may correspond to the bit ("without relevance rank value"/"with relevance rank value"). For data blocks, for which no relevance rank value was determined, a corresponding value ("without relevance rank value") may be stored in the classification field; this may be a standard entry for example. It is only necessary to produce entries for data blocks, for which a relevance rank value was determined and is stored ("with relevance rank value"), in the relevance table or relevance list, so that memory space may be saved if a relevance rank value is determined only for a portion of the data blocks.

A cache memory according to the present invention comprises at least one set of multiple memory blocks, which are configured to store data blocks, and a control unit, which is configured to carry out a method according to example embodiment(s) of the present invention.

According to an example embodiment of the present invention, the cache memory preferably comprises a rank data memory area, which is configured to store the rank data. The rank data memory area may be part of a management data memory area, in which data are stored that concern the data blocks temporarily stored in the memory blocks of the cache memory, e.g., which data block (i.e., its address in the main memory) is stored in a memory block, or whether it was overwritten by the processor ("dirty tag"), and the like. The rank data memory area is not necessarily a contiguous memory area, but rather an entry (which typically comprises several bytes) may be provided for each memory block in the management data memory area, which also comprises the rank data for this memory block.

A processing unit according to an example embodiment of the present invention comprises a processor, a main memory and a cache memory according to the present invention, which is configured temporarily to store data blocks stored in the main memory.

Additional advantages and developments of the present invention derive from the description and the figures.

The present invention is represented schematically in the figures on the basis of exemplary embodiments and described below with reference to the figures.

DETAILED DESCRIPTION OF EXAMPLE EMBODIMENTS

Figure 1:
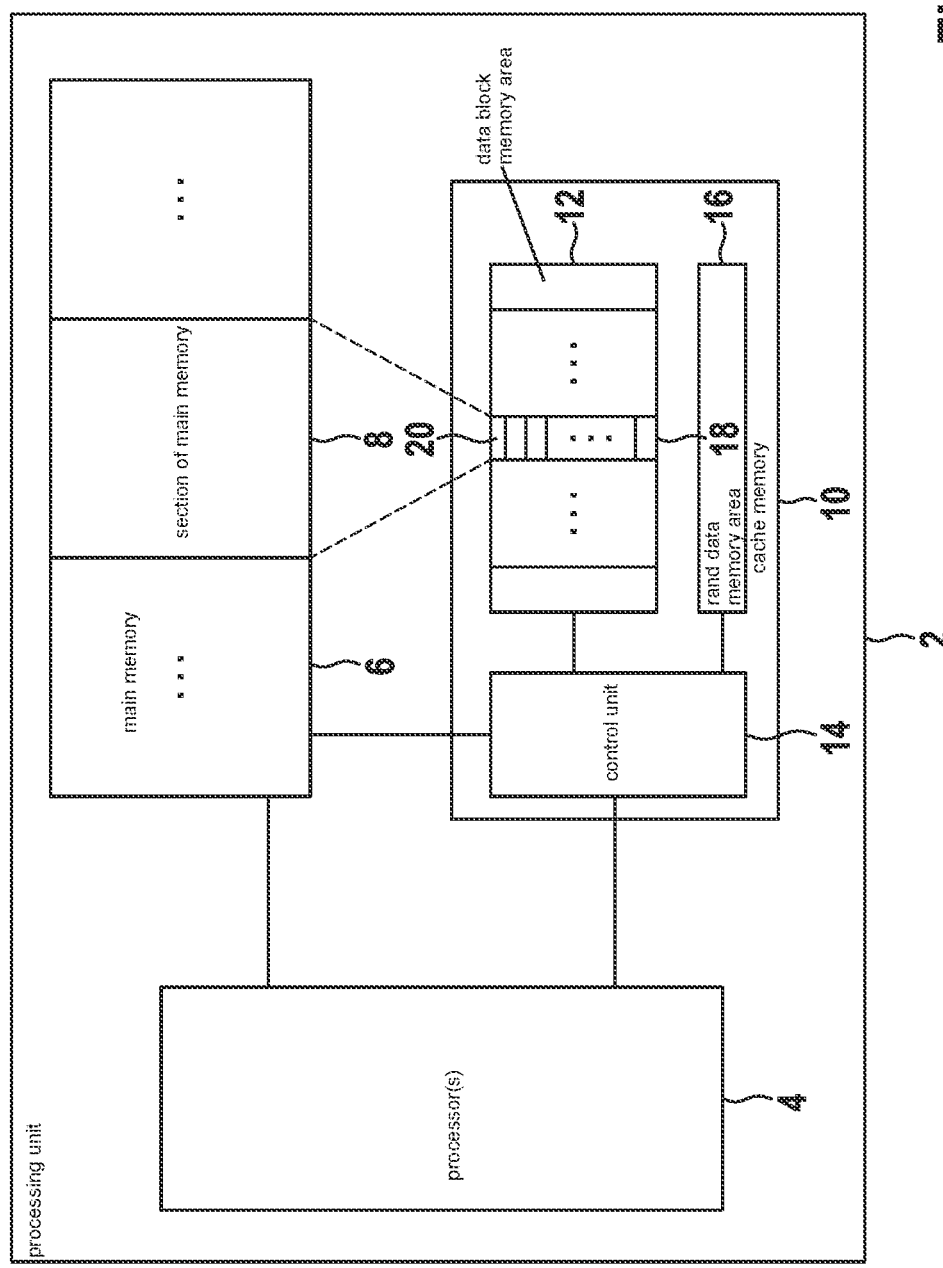
FIG. 1 shows a processing unit having a cache memory according to a preferred specific embodiment of the present invention.

FIG. 1 shows a processing unit 2 having a cache memory 10 according to a preferred specific embodiment of the present invention. The processing unit 2 comprises a processor 4, which is designed to execute computer programs that are stored in a main memory 6 (working memory). A cache memory 10 is provided in order to accelerate access to the main memory 6. Cache memory 10 comprises a data block memory area 12, a control unit 14 and a rank data memory area 16.

The data block memory area 12 is configured temporarily to store data blocks, which are stored in the main memory 6 and are read by processor 4, in order to be able to access these more quickly if they are again requested by processor 4. The data block memory area 12 comprises or is organized in at least one set 18 having multiple memory blocks 20, it being possible for one data block to be stored in each memory block. A size of a memory block or data block may in principle be selected arbitrarily in accordance with the requirements or conditions of the main memory and/or processor architecture used. The size may be, e.g., 16 bytes, 32 bytes, 64 bytes or 128 bytes etc. The set 18 serves to store temporarily data blocks, which are stored in a specific section 8 of the main memory 6 associated with set 18. As an alternative to what is presented here, the section associated with the set may also be non-contiguous, i.e., it may be made up of multiple partial sections distributed across the main memory. Different sets are associated with different sections of the main memory, that is, every data block stored in the main memory may be temporarily stored in precisely one of the sets. The size of the main memory sections is many times greater than the size of the sets, e.g., the number of data blocks in a main memory section 8 may be greater by several orders of magnitude (e.g., $10^3$ to $10^6$) than the number of memory blocks in a set (this corresponds to the size ratio of the main memory to the data block memory area). The number of memory blocks in a set known as associativity may as such be an arbitrary number, e.g., 2, 4, 8, 16 etc. A fully associative variant, i.e., there is only one set that includes all memory blocks, is also possible.

The control unit 14 is used to control the cache memory 10. This includes on the one hand the data communication with the processor 4 and the main memory 6. On the other hand, control unit 14 is configured to carry out a method according to the present invention. The utilized rank data are stored in the rank data memory area 16. The rank data memory area 16 may be part of a memory area (not shown), in which management data regarding the data blocks stored in the memory blocks are stored; to this extent, the rank data may be regarded as management data or may be comprised by the latter.

The processor 4 and the cache memory 10 are represented here as separate elements for illustrative purposes, it being possible for the data communication between the cache memory and the main memory to occur directly or indirectly (via the processor). Preferably, however, cache memory 10 is part of processor 4, it being possible for the control unit 14 of cache memory 10 to be part of a memory control of processor 4. It is also possible that the cache memory and the main memory are provided in a memory device, e.g., in a hard disk drive or a solid state drive, which is connected to the processor, which may also be contained in a processing unit separate from the memory device, via a data interface, e.g., PCIe, USB or SATA.

Figure 2:
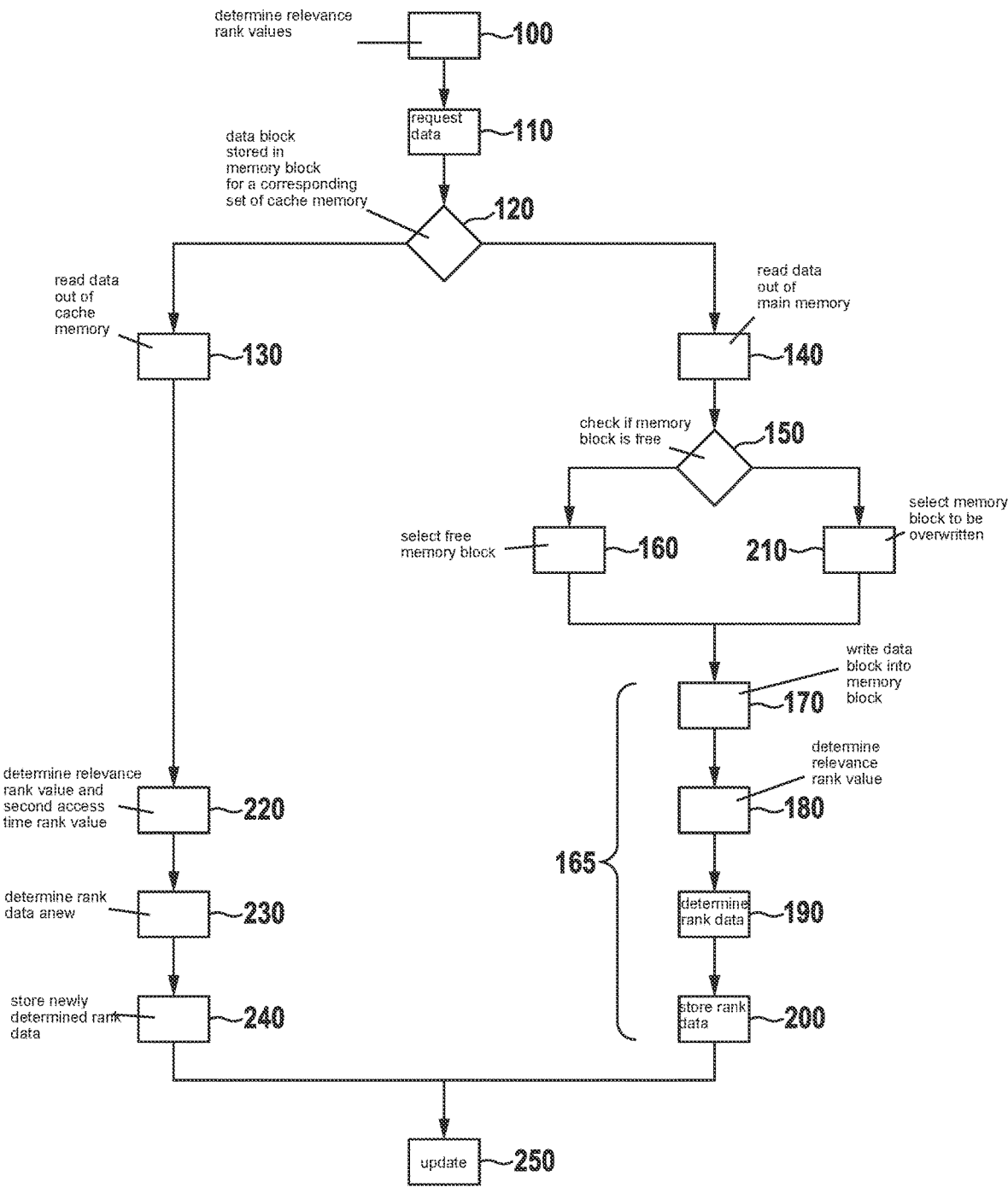
FIG. 2 shows a flow chart of a memory access, a cache memory being accessed in accordance with preferred specific embodiments of the present invention.

FIG. 2 shows a flow chart of a memory access, a cache memory being accessed in accordance with preferred specific embodiments of the present invention. The general sequence of the memory access is illustrated, which also includes steps that are optional. In particular, steps 110, 120, 130, 140 refer to such instances.

In step 110, data are requested (for example by the processor), which are stored at a specific memory address in the main memory. In step 120, a check is performed (by the control unit of the cache memory) to determine whether the data block, in which the memory address is contained, is stored in a memory block of a corresponding set of the cache memory. If this is the case, then the data are read out of the cache memory in step 130 (see also steps 220, 230, 240 further below), and, if this is not the case, the data are read out of the main memory in step 140.

When the data in step 140 are read out of the main memory, the data or the data block, within which they are contained, may be stored in the cache memory. This represents a cache write access. For this purpose, a check is first performed in step 150 to determine whether a memory block is free or unoccupied in the set that is assigned to the data or the data block, in which these are contained. If this is the case, this free memory block is selected in step 160 (if several memory blocks in the set are free, one of these several is selected) and the system proceeds to write the data block into the selected memory block. This writing or this writing process 165 comprises the steps 170, 180, 190, 200.

In step 170, the data block to be stored is written into the memory block. The writing of the data block to be stored into the memory block may be performed independently of the further steps 180 (determining the relevance and access time rank values), 190 (determining the rank data), 200 (writing the rank data), prior to, following, between or even in parallel to these steps.

In step 180, a relevance rank value of the data block to be stored, i.e., a value that indicates the priority with which the data block is to held in reserve in the cache, and a first access time rank value, i.e., a value that characterizes the time of the write access, is determined.

In step 190, rank data (which are assigned to the memory block, into which the data block is written) are determined from the relevance rank value and the first access time rank value. The rank data represent a combined rank value. In order to determine the rank data, a write rank mapping is used, i.e., a mapping or function that assigns the rank data to each pair of relevance rank value and access time rank value. The write rank mapping may depend on the rank data, relevance rank values and/or access time rank values of other memory blocks or of the data blocks stored therein, e.g., if the rank data describe merely a ranking of the memory blocks in the set.

In step 200, the rank data are stored, e.g., are written into the rank data memory area.

Returning to step 150, if it is determined that no memory block in the set (which is assigned to the data or the data block, in which these are contained) is unoccupied or free, a memory block of the set that is to be overwritten is selected in step 210. This selection occurs on the basis of the rank data, which are assigned to the memory blocks enclosed in the set, i.e., the memory block is selected, whose rank data indicate the lowest priority of a further temporary storage. For which memory block this is the case is determined by the rank data, which encode this "priority"; typically, the rank data comprise at least one value, the memory block, for which this value is the greatest or the smallest, being selected. The rank data may be provided, e.g., as a modified access time rank value or may comprise such, the memory block having the oldest modified access time (lowest or highest access time rank value) being then selected, it being possible to take other aspects (e.g., encoded in the rank data) into account, for example if two memory blocks have the same modified access time rank value.

When the data are read out of the cache memory in step 130, the rank data of the memory block, in which the respective data block is stored, may be updated upon reading. This occurs in the steps 220, 230 and 240, which essentially correspond to the steps 180, 190 and 200.

In step 220, the relevance rank value of the data block to be read and a second access time rank value (the second access time rank value refers to the cache read access, in contrast to the first access time rank value, which refers to the cache write access) are determined.

In step 230, rank data associated with the memory block are determined anew by way of a read rank mapping from the relevance rank value and the second access time rank value. Read rank mapping may be identical to write rank mapping or may differ from the latter, it being possible for example to take into account that a cache hit already occurred for the data block.

In step 240, the rank data newly determined in step 230, which are assigned to the memory block, are stored (e.g., in the rank data memory area, by overwriting the old rank data).

In both cases, i.e., in a cache read access (steps 130, 220, 230, 240) and in a cache write access (steps 140 to 210), the rank data of memory blocks, which were not accessed may optionally also be newly determined or updated. This may be provided especially when the rank data encode a relative priority of the memory blocks. Thus, in step 250, the (stored) rank data of memory blocks of the set, which are not accessed (neither by reading nor by writing), are preferably updated. For this purpose, an update mapping may be used, which is applied to the stored rank data and which may also depend on the relevance rank values of the respective data blocks, in order to determine the rank data anew. The newly determined rank data may then be stored, e.g., by overwriting the old rank data.

Furthermore, a determination of the relevance rank values for data blocks may preferably occur in step 100 (in preparatory fashion). For this purpose, multiple execution times of a computer program or of parts of a computer program may be measured, wherein, respectively, for the purpose of measuring different execution times, data blocks to be tested (these are data blocks, in which the computer program is stored or which it accesses) are selectively excluded from temporary storage in the cache or, if they are accessed, are kept in reserve in the cache memory for a specified number of memory accesses (that is, are not deleted). By comparing the execution times, the respective relevance of the corresponding data blocks to be tested may be inferred. The determination of the relevance rank values occurs preferably prior to the implementation of the method (in the regular computer program execution), but may also be carried out in parallel to it, in that different relevance rank values are assigned to each data block to be tested, for example in repeated program execution, and associated execution times are recorded.

What is claimed is:

1. A method for operating a cache memory, the cache memory including a plurality of memory blocks in which data blocks are storable, the plurality of memory blocks being arranged in a memory-block-set of the cache memory, the method comprising the following steps:
   in a first write process:
      writing a first of the data blocks into a first one of the memory blocks;
      determining a relevance rank value of the first data block and a first access time rank value of the first data block;
      determining cache rank data corresponding to the first memory block using a write rank mapping from the relevance rank value of the first data block and the first access time rank value of the first data block; and
      storing the determined cache rank data corresponding to the first memory block in association with the first memory block; and
   in a second write process performed when none of the memory blocks of the memory-block-set is free:
      selecting, from the memory-block-set, one of the memory blocks as being overwritable, the selecting being performed based on respective cache rank data that are respectively associated with respective ones of the memory blocks of the memory-block-set, including the cache rank data that has been stored in association with the first memory block; and
      based on the selecting, writing a second of the data blocks into the selected one of the memory blocks of the cache memory;
   wherein the method includes at least one of the following six features (I)-(VI):
      (I) the relevance rank value of the first data block is a measurement that is at least one of:
         (a) of a difference between a program execution time when the first data block is in the cache memory and a program execution time when the first data block is not in the cache memory; and
         (b) is not dependent upon timing of presence of the first data block in the cache memory;
      (II) the method further comprises, in a cache read access, in which a stored one of the data blocks is read out of one of the memory blocks of the memory-block-set:
         determining the relevance rank value of the data block being read;
         determining a second access time rank value of the data block being read;
         determining anew the cache rank data associated with the one of the memory blocks out of which the stored one of the data blocks is read, the determining anew of the cache rank data being performed using a read rank mapping from (a) the relevance rank value of the data block being read and (b) the second access time rank value; and
         storing the cache rank data that is determined anew in association with the one of the memory blocks out of which the stored one of the data blocks is read;
      (III) when at least one of the memory blocks of the memory-block-set is free in a cache write access in which one of the data blocks is being stored in the memory-block-set, the at least one free memory block is selected, and the data block being stored is written into the at least one free memory block;
      (IV) the cache rank data includes a modified access time rank value that is determined from a result of an application of a relevance function to the relevance rank value and from the access time rank value;
      (V) the cache rank data includes a step value that is (a) determined based on the relevance rank value of the data block being written and (b) changed after a specific number of cache write accesses and/or cache read accesses; and
      (VI) the method further comprises, responsive to a cache access of one of the memory blocks of the memory-block-set, updating cache rank data of one or more other ones of the memory blocks of the memory-block-set.

2. The method as recited in claim 1, wherein the method comprises, in the cache read access, in which the stored one of the data blocks is read out of one of the memory blocks of the memory-block-set:
   determining the relevance rank value of the data block being read;
   determining the second access time rank value of the data block being read;
   determining anew the cache rank data associated with the one of the memory blocks out of which the stored one of the data blocks is being read, the determining anew of the cache rank data being performed using the read rank mapping from (a) the relevance rank value of the data block being read and (b) the second access time rank value; and storing the cache rank data that is determined anew in association with the one of the memory blocks out of which the stored one of the data blocks is read.

3. The method as recited in claim 2, wherein the read rank mapping is identical to the write rank mapping.

4. The method as recited in claim 2, wherein:
the cache rank data includes a combined rank value obtained by application of a combination function to the relevance rank value and the first or second access time rank values;
the selecting is of the memory block that has a lowest of the combined rank values or that has a highest of modified combined rank values.

5. The method as recited in claim 1, wherein, when at least one of the memory blocks of the memory-block-set is free in the cache write access in which the one of the data block is being stored in the memory-block-set, the at least one free memory block is selected, and the data block being stored is written into the at least one free memory block.

6. The method as recited in claim 1, wherein the cache rank data includes the modified access time rank value that is determined from a result of an application of the relevance function to the relevance rank value and from the access time rank value.

7. The method as recited in claim 6, wherein the selecting is of the memory block that has a lowest of the modified access time rank values or that has a highest of modified access time rank values.

8. The method as recited in claim 6, wherein, when multiple memory blocks of the memory-block-set have the same lowest or the same highest combined or modified access time rank value, based on which the selecting is of one of the multiple memory blocks.

9. The method as recited in claim 1, wherein the cache rank data includes the step value that is (a) determined based on the relevance rank value of the data block being written and (b) changed after the specific number of cache write accesses and/or cache read accesses.

10. The method as recited in claim 9, wherein:
following the specific number of cache write accesses and/or cache read accesses, the step value is reduced or increased and a memory block of the set that has a lowest step value is selected as the memory block of the set to be overwritten or a memory block that has a highest step value is selected as the memory block to be overwritten;
the cache rank data include the access time rank value; and
when multiple memory blocks have the lowest or the highest step value, the memory block is selected as the memory block to be overwritten that has a lowest access time rank value or that has a highest access time rank value.

11. The method as recited in claim 1, wherein the method further comprises, responsive to the cache access of one of the memory blocks of the memory-block-set, updating the cache rank data of the one or more other ones of the memory blocks of the memory-block-set.

12. The method as recited in claim 1, wherein the relevance rank value of the first data block is the measurement of the difference between the program execution time when the first data block is in the cache memory and the program execution time when the first data block is not in the cache memory.

13. The method as recited in claim 12, wherein, for determining the relevance rank values for data blocks, at least one computer program, which includes the data blocks or accesses the data blocks, is executed repeatedly by a processor connected to the cache memory in respective execution times that are measured, one or more of the data blocks being selectively excluded from storage in the cache memory or, after an initial storage in the cache memory, being prevented from being deleted from the cache memory for a specified number of memory accesses, the relevance rank values of the data blocks being determined based on the measured execution times.

14. The method as recited in claim 13, further comprising:
supplementing page table entries in order to store the determined relevance rank values;
wherein: (i) in a relevance field of a page table entry, which refers to a tested data block, the determined relevance rank value for the tested data block is stored, or (ii) in a classification field of a page table entry, which refers to a tested data block, a value is stored that indicates that a relevance rank value was determined for the tested data block, and the relevance rank value determined for this tested data block is stored in a relevance table or a relevance list.

15. The method as recited in claim 1, wherein the relevance rank value of the first data block is the measurement that is not dependent upon the timing of presence of the first data block in the cache memory.

16. A cache memory comprising:
a plurality of memory blocks in which data blocks are storable and that are arranged in a memory-block-set; and
a processor, wherein:
the processor is programmed to:
in a first write process:
write a first of the data blocks into a first one of the memory blocks;
determine a relevance rank value of the first data block and a first access time rank value of the first data block;
determine cache rank data corresponding to the first memory block using a write rank mapping from the relevance rank value of the first data block and the first access time rank value of the first data block; and
store the determined cache rank data corresponding to the first memory block in association with the first memory block; and
in a second write process performed when none of the memory blocks of the memory-block-set is free:
select, from the memory-block-set, one of the memory blocks as being overwritable, the selection being performed based on respective cache rank data that are respectively associated with respective ones of the memory blocks of the memory-block-set, including the cache rank data that has been stored in association with the first memory block; and
based on the selection, write a second of the data blocks into the selected one of the memory blocks of the cache memory; and
the cache memory includes at least one of the following six features (I)-(VI):
(I) the relevance rank value of the first data block is a measurement that is at least one of:

(a) of a difference between a program execution time when the first data block is in the cache memory and a program execution time when the first data block is not in the cache memory; and (b) is not dependent upon timing of presence of the first data block in the cache memory;

(II) in a cache read access, in which a stored one of the data blocks is read out of one of the memory blocks of the memory-block-set, the processor is programmed to:

determine the relevance rank value of the data block being read;

determine a second access time rank value of the data block being read;

determine anew the cache rank data associated with the one of the memory blocks out of which the stored one of the data blocks is read, the determining anew of the cache rank data being performed using a read rank mapping from (a) the relevance rank value of the data block being read and (b) the second access time rank value; and store the cache rank data that is determined anew in association with the one of the memory blocks out of which the stored one of the data blocks is read;

(III) when at least one of the memory blocks of the memory-block-set is free in a cache write access in which one of the data blocks is being stored in the memory-block-set, the at least one free memory block is selected, and the data block being stored is written into the at least one free memory block;

(IV) the cache rank data includes a modified access time rank value that is determined from a result of an application of a relevance function to the relevance rank value and from the access time rank value;

(V) the cache rank data includes a step value that is (a) determined based on the relevance rank value of the data block being written and (b) changed after a specific number of cache write accesses and/or cache read accesses; and (VI) the processor is programmed to, responsive to a cache access of one of the memory blocks of the memory-block-set, update cache rank data of one or more other ones of the memory blocks of the memory-block-set.

17. The cache memory as recited in claim 16, further comprising a rank data memory in which the cache rank data is stored.

18. A memory system comprising:
a main memory; and
a cache memory, wherein:
the cache memory includes:
a plurality of memory blocks in which data blocks from the main memory are temporarily storable and that are arranged in a memory-block-set; and
a processor;
the processor is programmed to:
in a first write process:
write a first of the data blocks into a first one of the memory blocks;
determine a relevance rank value of the first data block and a first access time rank value of the first data block;

determine cache rank data corresponding to the first memory block using a write rank mapping from the relevance rank value of the first data block and the first access time rank value of the first data block; and store the determined cache rank data corresponding to the first memory block in association with the first memory block; and in a second write process performed when none of the memory blocks of the memory-block-set is free:

select, from the memory-block-set, one of the memory blocks as being overwritable, the selection being performed based on respective cache rank data that are respectively associated with respective ones of the memory blocks of the memory-block-set, including the cache rank data that has been stored in association with the first memory block; and based on the selection, write a second of the data blocks into the selected one of the memory blocks of the cache memory; and the memory system includes at least one of the following six features (I)-(VI):

(I) the relevance rank value of the first data block is a measurement that is at least one of:
(a) of a difference between a program execution time when the first data block is in the cache memory and a program execution time when the first data block is not in the cache memory; and
(b) is not dependent upon timing of presence of the first data block in the cache memory;

(II) in a cache read access, in which a stored one of the data blocks is read out of one of the memory blocks of the memory-block-set, the processor is programmed to:

determine the relevance rank value of the data block being read;

determine a second access time rank value of the data block being read;

determine anew the cache rank data associated with the one of the memory blocks out of which the stored one of the data blocks is read, the determining anew of the cache rank data being performed using a read rank mapping from (a) the relevance rank value of the data block being read and (b) the second access time rank value; and store the cache rank data that is determined anew in association with the one of the memory blocks out of which the stored one of the data blocks is read;

(III) when at least one of the memory blocks of the memory-block-set is free in a cache write access in which one of the data blocks is being stored in the memory-block-set, the at least one free memory block is selected, and the data block being stored is written into the at least one free memory block;

(IV) the cache rank data includes a modified access time rank value that is determined from a result of an application of a relevance function to the relevance rank value and from the access time rank value;

(V) the cache rank data includes a step value that is (a) determined based on the relevance rank value of the data block being written and (b) changed after a specific number of cache write accesses and/or cache read accesses; and (VI) the processor is programmed to, responsive to a cache access of one of the memory blocks of the memory-block-set, update cache rank data of one or more other ones of the memory blocks of the memory-block-set.

\* \* \* \* \*